Aug. 3, 1954
R. P. DUNMIRE
2,685,517
FOOD SUPPLEMENTS AND ANIMAL FEED
CONTAINING FOOD SUPPLEMENTS
Filed Aug. 17, 1945
4 Sheets-Sheet 1
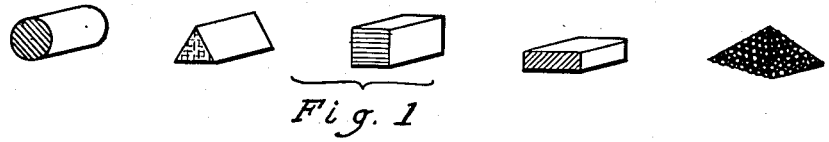
Fig. 1
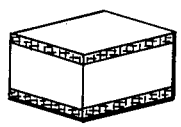
Fig. 2a
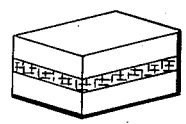
Fig. 2b
Plan Views 
Cross Sections
End Views
A    B    C    D    E    F    G
Clear Shell    Multi Colored Shell
Cross Sections
End Views
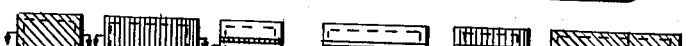
H    I    J    K    L    M    N
Colored Shell    Barrier    Strip
Fig. 3
    
Fig. 4a    Fig. 4b
INVENTOR.
RUSSELL P. DUNMIRE.
BY Aug. 3, 1954

R. P. DUNMIRE 2,685,517

FOOD SUPPLEMENTS AND ANIMAL FEED
CONTAINING FOOD SUPPLEMENTS

Filed Aug. 17, 1945

CHICK FEED SUPPLEMENT A
1 POUND SUPPLEMENT = 25000 PELLETS
FORTIFIES 100 POUNDS OF FEED AND CONTAINS:

| | | | INITIAL POTENCY |
|---|---|---|---|
| YELLOW | | PROVITAMIN A | 36000 INTERNATIONAL UNITS |
| BLUE | | VITAMIN D | 36000 A.O.A.C. CHICK UNITS |
| RED | | VITAMIN G | 53800 MICROGRAMS |

15.0000 % DIBASIC CALCIUM PHOSPHATE
35.2 % CALCIUM CARBONATE
.0125 % POTASSIUM IODIDE
1.23 % MANGANESE SULPHATE
48.57 % DIGESTIBLE FAT

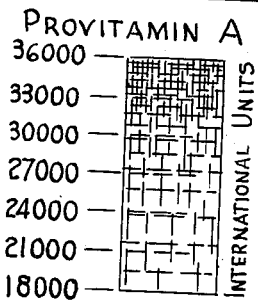
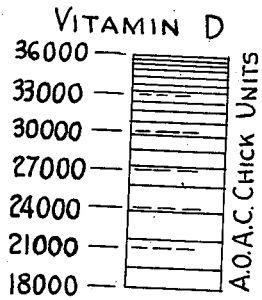
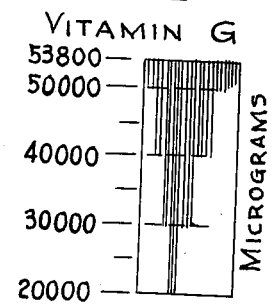

COMPARE VITAMINS WITH TOP COLORS TO DETECT DETERIORATION.
TO DETERMINE PRESENT POTENCY MELT PELLET TO DISTRIBUTE COLOR UNIFORMLY, HARDEN, MATCH COLOR OF RESULTANT BEAD WITH COMPARATOR AND READ POTENCY.
ONE POUND OF THIS CONCENTRATED SUPPLEMENT CONTAINS AN APPROXIMATELY EQUAL NUMBER OF YELLOW, BLUE AND RED PELLETS WHICH MIXED WITH ONE HUNDRED POUNDS OF FEED WILL AVERAGE A TOTAL OF 15 TO 16 PELLETS PER OUNCE OF FEED.

*Fig. 5*

INVENTOR.
RUSSELL P. DUNMIRE.
BY 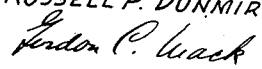

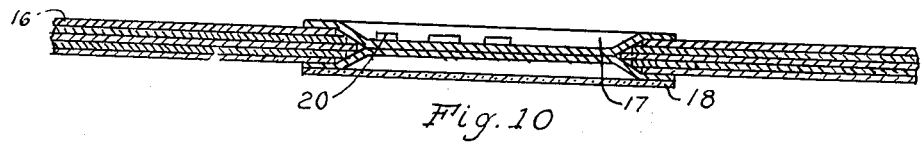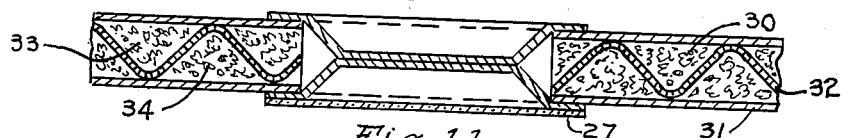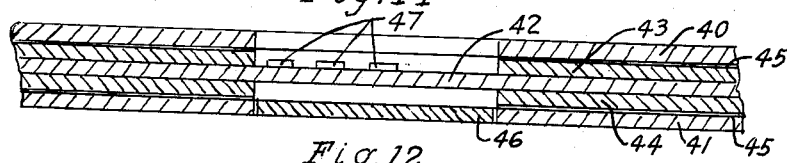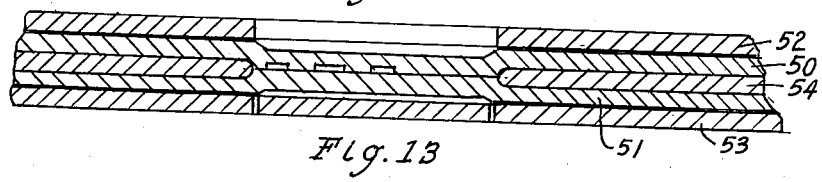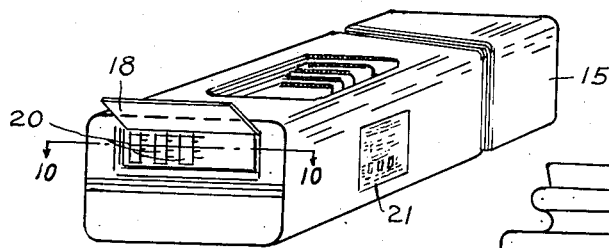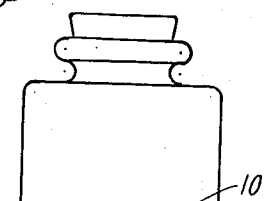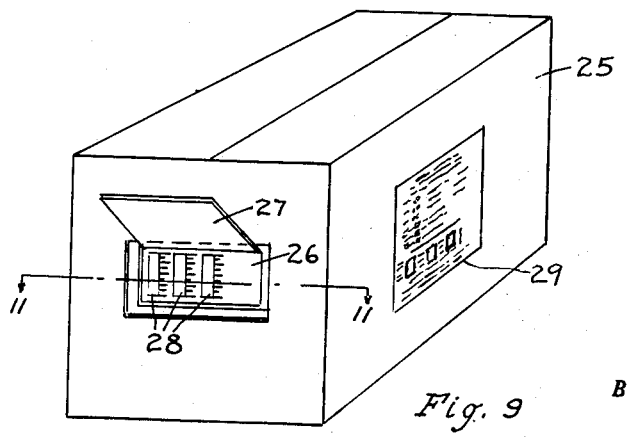

Patented Aug. 3, 1954

2,685,517

UNITED STATES PATENT OFFICE 2,685,517

FOOD SUPPLEMENTS AND ANIMAL FEED CONTAINING FOOD SUPPLEMENTS

Russell P. Dunmire, Chagrin Falls, Ohio, assignor to Nutrition Products, Inc., Cleveland, Ohio, a corporation of Ohio Application August 17, 1945, Serial No. 610,984

10 Claims. (Cl. 99—11)

This invention relates to foods, food supplements, etc., and, more particularly, to feed and feed supplements for livestock, poultry, and the like.

It includes feeds which are fortified with one or more supplemental materials contained in pellets or other bodies colored and/or shaped according to a predetermined code so as to be easily distinguished from one another and preferably also of such a size that by counting those present in a measured sample of a feed, the amount of the one or more supplemental materials present may readily be determined. In a preferred form of the invention a color standard is used for comparison with the color of the pellets, etc., so that it may be visually determined whether a food supplement such as described has deteriorated and the extent of deterioration.

The use of a color standard is not limited to comparison with solid bodies containing a supplement suitable for admixture with feeds. It may be used with any food supplement, etc., which is subject to deterioration, such as, for example, solid or liquid food supplements for human consumption in capsules or bottles, etc., and the invention includes such use for analysis. The invention includes a chart for colors and/or shapes for determining visually the composition, quality, and source, etc., of a food supplement—whether embodied in solid or liquid form—and a color comparator for visually determining the quality of a food supplement which is subject to deterioration. It includes capsules, bottles, and other containers for such food supplements and, more particularly, containers on which or in which such a chart and/or color comparator is provided.

The invention also includes packages for foods and feeds containing supplements and, more particularly, such packages on which or in which such a chart and/or color comparator is provided. The chart for use in any such package—whether it be a package for a food and/or a food supplement—may include on or in the package a key to the meaning of the colors and/or shapes of one or more of the supplementary materials contained therein for visual analysis thereof. For instance, it includes packages for feed for livestock or poultry, or packages containing such feed, on which or in which a key is provided which not only enables one to determine the nature of the one or more feed supplements admixed with the feed but also by visual inspection the amount of each such feed supplement present in the feed and the extent of its deterioration.

In a preferred form of the invention the supplement bodies to be mixed with a feed are composed of a fat of a digestible nature in which vitamins, minerals, etc., are incorporated. Such a feed may advantageously contain iodine to aid in assimilation of the fat. The fat may be formed into pellets which may be cut from a sheet or extruded ribbon, or molded or otherwise formed of predetermined size so that each pellet which embodies any one or more feed supplements contains the same amount of supplement although particles containing other supplements may be of different sizes and/or shapes.

In one preferred form of the invention various feed supplements are included in one pellet of fat. For instance, all of the pellets used for fortification of a particular feed may contain the same amount or per cent of fat and minerals and, in addition thereto, different vitamins, the pellets containing the respective vitamins being colored and/or shaped differently with relation to a predetermined code. The mixture of fat, etc., may be formed into pellets or other bodies in any desired manner. For instance, it may be finely divided as by spray-chilling; i. e., by spraying the molten fat into cold air. The size of such sprayed particles may vary but may, for example, be about the size of particles of sand or somewhat larger. Such particles are not apt to sift from a feed composed largely of grain (cracked or ground, etc.) but will remain substantially uniformly dispersed therein.

"Vitamin" is used herein in a general sense to include vitamins and materials such as the provitamins, vitamin esters, etc. The invention is not specific to any particular vitamin; and the term is, therefore, used most generally.

"Food supplement" and "feed supplement" are used herein to include any one or more vitamins, medicants, proteins, minerals, carbohydrates, enzymes, hormones, amines, and other chemicals, etc., or mixtures thereof suitable for addition to foods and feeds, respectively. When contained in capsules, food supplements are usually designed for oral administration without first being mixed with a food.

"Color" is used in the general sense and includes black, white, and water white.

It is recognized that foodstuffs generally may be naturally deficient in vitamins, minerals, proteins, carbohydrates, enzymes, etc. To supplement the same, whether deficient or not, and even to administer medicines and the like, such substances are added to the natural diet for fortification purposes, often in the form of concentrates.

In the past it has been necessary to subject a foodstuff containing a food supplement to chemical or biological analysis in order to determine the amount and/or nature of the supplementary material added. This is now found to be unnecessary. By incorporating a prearranged quantity of one or more food supplements in one or more series of pellets or other bodies which act as carriers, each of which is distinctively shaped and/or colored according to a prearranged system, and admixing the supplement or supplements with the foodstuff in this form, the nature and, if desired, also the amount of the supplement present in any foodstuff may be readily analyzed by merely noting the color and/or shape of the added bodies or determining the number of each present and also, if desired, the extent of deterioration, if appreciable. Such visual analysis provides against misrepresentation as to the content of vitamin or other supplement in any foodstuff, thereby providing a simple and effective method of inspection.

Various edible materials in which the food supplements may be dispersed may be used as a carrier, such as gelatin, starch, casein, etc. A fat obtained by hydrogenation of an oil, such as hydrogenated soya-bean oil, hydrogenated fish oil, and the like, is preferred because it has high nutritional value; and by hydrogenating it until the material becomes very hard, decomposable supplementary materials incorporated in it are protected from air, light, etc., so that little, if any, deterioration occurs during prolonged storage. Vitamins dispersed in bodies of such materials have been found much more resistant to deterioration than some of the best vitamin preparations now on the market, including vitamin esters. Interchemical reactions between chemicals and/or vitamins, etc., in such mixtures is prevented so that materials capable of interaction may be incorporated in the same fat body.

Pellets or fine particles or other bodies of such fats or other solid carrier in which the food supplements are dispersed may be sold in bulk to a farmer, miller or other person handling feeds to be mixed by him in any desired amount into any type of feed. Pellets, etc., of the same composition may be packaged separately, or pellets, etc., of different compositions may be mixed in any desired proportion and sold as a mixture.

Ordinarily, all of the pellets containing any particular food supplement will contain the same percentage amount of the food supplement. However, this need not necessarily be true, and patent claims limited to such an adaptation of the invention would be too easily avoided. Thus, for example, one might add 10 per cent of a food supplement to half of the pellets containing a certain supplement and 30 per cent of the same supplement to the other half of the pellets in order to fortify a feed with the same amount of supplement as would be added by the same number of pellets, each containing 20 per cent of the food supplement. Although in a preferred form of the invention all of the pellets to which one food supplement is added will be of one size and shape and color, this, likewise, may be varied. Thus, an equal number of pellets of two different sizes might be employed to give the same additive effect as using pellets all of a size intermediate between the two. For instance, in supplementing the nutritional value of any particular feed, if in the preferred form of the invention one hundred pellets of the same size containing 10 per cent of a food supplement are employed, one might use fifty larger pellets and fifty smaller pellets having the same total content of the food supplement—whether the content of food supplement was the same in all of the pellets or whether it varied and averaged a given amount so as to produce the desired total supplement. Furthermore, all of the pellets, etc., containing a particular food supplement need not be similarly colored or shaped for identification. For instance, only one in every five or ten might be thus distinctively marked. Then, a given quantity of feed containing one hundred pellets of one supplement here designated X for convenience and fifty pellets of another supplement here designated Y might contain only ten pellets distinctively colored or shaped to indicate that they contain X and ten others distinctively colored or shaped to indicate that they contain Y, and the other one hundred thirty pellets might be identical with one another in color and shape. This might facilitate analysis by reducing the number of pellets it would be necessary to count in evaluating the supplement present.

It is possible to include markers which identify the supplement but contain none of it. For instance, one red or square marker may be included in each one hundred pellets of X, and one black or triangular marker may be contained in each one hundred pellets of Y. Although such a system of identification and marking might be devised to avoid patent claims which relate only to the preferred method in which all pellets containing a particular food supplement are marked in an identical manner, it is not recommended.

Thus, there are various methods of carrying out a preferred form of the invention which in its essence relates to the use of food supplements incorporated in pellets, etc., of a fat or other carrier which need only to be observed to determine the nature of the food supplement present and need only to be counted to determine the amount of the food supplement present—whether in bulk or mixed with a feed.

It is generally recognized that various of the vitamins and other food supplements are subject to decomposition so that on storage over any long period they are apt to deteriorate, resulting in decreased potency. By incorporation in a pellet, etc., of a fat the food supplements are protected from excessive deterioration, and there is little loss in potency, but when incorporated in other solid carriers, such loss may be quite appreciable. For the measurement of supplements to be added to foods, it is often desirable to know the extent of deterioration which has taken place and to correct for it either in adding a supplement to a feed or in determining the amount of a food supplement already added to a feed. Similarly, it is desirable to know the extent of the deterioration, if any, which has taken place in a capsule of such a decomposable food supplement prepared for human consumption, etc. To determine the extent of deterioration, this invention contemplates coloring any embodiment of a decomposable food supplement—whether in a bottle, pellet or capsule, etc., and whether administered from liquid or solid bulk, or whatever its state, with a coloring material which changes color. The rate of change in the coloring material may be comparable to the rate at which the food supplement decomposes. Then, by noting whether a color change has taken place or noting the magnitude of the change which has taken place, preferably by comparing the changed color with the permanent color or colors on a color comparator, it will be shown whether deterioration has taken place and, also, the relative amount thereof. If necessary, such deterioration may be compensated for by providing an additional amount of supplement to compensate for the deterioration.

The color comparator may be combined with a bottle or other container and/or may be combined with a key which interprets the distinguishing characteristics of the various pellets, capsules, etc., in terms of useful information regarding the food supplements which each contains. Thus, the nature and amount of the one or more food supplements contained in a pellet, capsule, etc., or in a given number of pellets, etc., per given small weighed or measured sample of the feed can be determined visually without the necessity of any chemical analysis.

An opaque solid body, such as a pellet or the like, having incorporated therein a fadeably colored vitamin, such as carotene, fades at a greater rate on the surface than the mean fading rate of the entire body. Such surface change is of distinct advantage since it quickly shows a relatively small amount of deterioration. Such a body may, therefore, advantageously be broken and the potency determination made on the basis of the color of the interior. A much more accurate determination may be made by melting or dissolving the pellet in a standard manner to obtain an average distribution of the coloring material and using the resulting average for making the visual analysis.

The calculation of the deterioration need not depend upon reference to a separate color chart. For instance, in preparing a capsule for provitamin A (carotene), one half of the capsule may be made of colorless gelatin, and the other half of gelatin colored with a permanent shade of yellow with which the color of the solution of the provitamin within the capsule may be compared for an approximation of the loss or merely to determine whether any appreciable deterioration has occurred. Different shades of yellow may be used in different locations on the capsule to aid in evaluating the loss in potency or deterioration of the contents which has occurred.

The invention will be further described in connection with the accompanying drawings, in which:

Fig. 1 illustrates in perspective a number of pellets of different shape and color and bodies of smaller size;

Figs. 2a and 2b illustrate pellets which embody a color comparator;

Fig. 3 illustrates various types of capsules which may be used in carrying out the invention;

Figs. 4a and 4b are side views of different types of capsules which embody a color comparator;

Figs. 5 and 6 are charts which embody a key for analysis of the supplement content in a package of feed together with color comparators to aid in such analysis;

Fig. 7 is a bottle which embodies a color comparator;

Figs. 8 and 9 show in perspective packages which may be used in carrying out the invention;

Fig. 10 is a section on the line 10—10 of Fig. 8;

Fig. 11 is a section on the line 11—11 of Fig. 9; and

Figs. 12 and 13 are sections of alternative wall structures.

Figure 6:
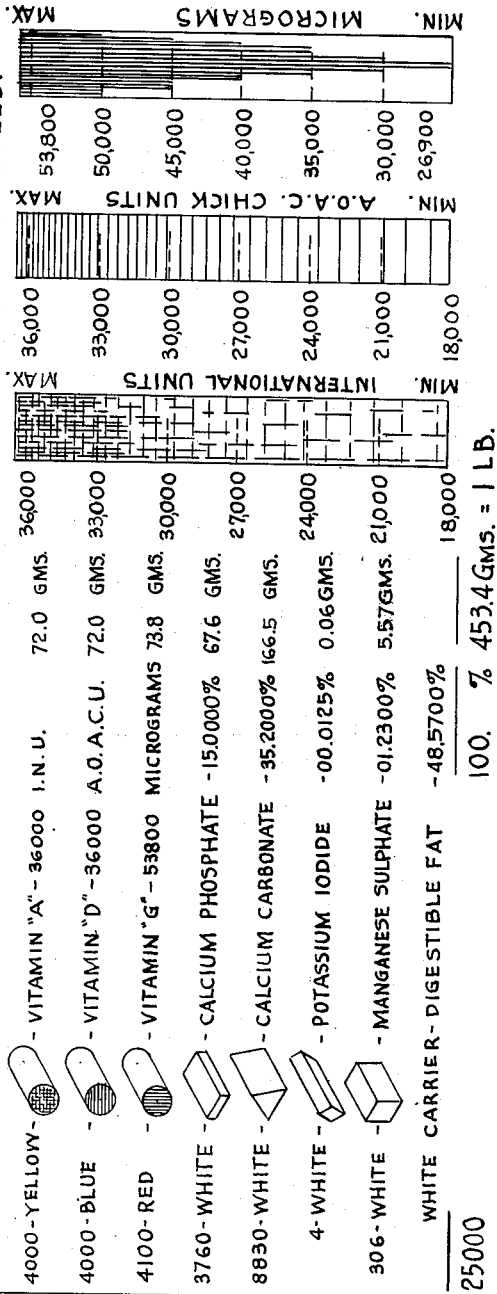

Fig. 1 illustrates four extruded pellets of different cross sections, differently colored. Any key to the identification thereof may be employed. For instance, all vitamins may be embodied in cylindrical pellets which are colored differently to distinguish the individual vitamins; all hormones may be embodied in pellets of square cross section, colored differently to distinguish the individual hormones; all mineral fortifiers may be embodied in pellets triangular in cross section, colored differently to distinguish the individual minerals or combinations of minerals, etc. Where desirable, minerals and vitamins, for example, may be combined in the same pellet and be distinctively marked as merely a separate food supplement, or the marking may indicate that pellets so marked contain both vitamin and mineral. The possible combinations of the primary colors and simple shapes which may be formed by extrusion or otherwise is so large that color and shape may be used to identify any reasonable number of the individual characteristics of different food-supplement products, such as the different ingredients present, the content of each, their purity, source, etc. The use of coatings, etc., on parts of the pellets further increases the possible combinations.

The same key to identification and analysis may apply to all the products marketed by a single manufacturer or association of manufacturers. In that case, the same color and shape, for example, may be used to indicate the supplement content and strength of all the products regardless of their intended use. For example, green may be used to indicate a certain vitamin in all the various products produced, and because it is desirable to use vitamins of different potency for different purposes—such as for human consumption, a hog feed, and chick feed, for example— green squares may contain the vitamin in one concentration for human consumption, and green triangles and rods may contain the same vitamin but in different concentrations for hog and chick feed, respectively. Where different manufacturers use the same code, the pellets from each source may be identified by characteristic ribs, etc.

The pellets need not all be of any particular composition. For example, a hardened fat may be best for the administration of a certain feed supplement or for administration to a particular animal or bird, and gelatin or some other carrier may be preferred under different circumstances. Food supplements dispersed in different carriers may be used in admixture with the same foodstuff. Shape or color may be used to indicate the nature of the carrier as well as the kind and amount of supplement.

The hydrogenated fat which is the preferred type of carrier for most purposes may be obtained by hydrogenating any suitable oil base. Usual hydrogenation procedure may be employed. The method of adding the vitamin, etc., will depend upon its nature and the nature of the carrier to which it is added. Oil-soluble vitamins may be added to hydrogenated fats as solutions in a suitable oil which may be dissolved in the fat in a heated, molten condition. Mineral matter, such as phosphates, etc., may be finely ground and dispersed in the molten fat by any suitable means. Water-soluble vitamins or other materials may be added to the fat in dry form. These supplements may be dispersed in the molten fat by any suitable method. When uniformly incorporated, the fat, if hydrogenated to a hard waxy state, preserves the vitamins and other food supplements from air and light so that they have a marked degree of stability. Such fat so protects the supplements that one pellet or other small body may contain two or more supplements which mixed in bulk would react chemically with one another on prolonged contact. They may be incorporated in the same small body of hard fat without danger of interaction if each is finely dispersed in the fat.

The solid carrier of which the pellets are composed may have other material than the food supplement admixed therewith. For example, a hard hydrogenated fat may have cereal grains, such as wheat or cracked wheat, corn, oats, barley, buckwheat, milo, millet, etc., incorporated therewith. Such a mixture may readily be formed into pellets of the type here contemplated and be colored or distinctively shaped for identification purposes.

Cereal grains themselves may be used instead of pellets and be impregnated with supplements and colored, if desired, to indicate their supplement content. Various grains may be impregnated with different supplements, and the shapes of the grains may be the only identifying characteristic required. Then, the addition of coloring matter is unnecessary.

The pellets containing the various food supplements are advantageously made approximately the mean size of the particles of the food to which they are to be added. Then, in normal handling, they will not separate out from the main body of the food. If it is intended that they be counted, they are made large enough to be easily counted by the naked eye, preferably being appreciably larger than one millimeter in the smallest dimension. For example, if wheat is to be fortified, the pellets, etc., used will advantageously be made substantially the same size as the whole wheat. On the other hand, for chicken-scratch feed containing cracked wheat, pellets of smaller size are preferably used and may, for example, if cylindrical, advantageously be made approximately $\frac{3}{32}$ inch in diameter and about $\frac{3}{32}$ inch long. If not circular in cross section, they may advantageously be made to have a cross-sectional area the equivalent of a circle about $\frac{3}{32}$ inch in diameter.

Fig. 1 illustrates the shapes and colors which may be used. It illustrates a green cylindrical pellet, a yellow triangular pellet, a blue block-like pellet, a brown flat rectangular pellet, and a pile of spray-chilled particles about the size of sand which may be colored according to the same or a different code.

The pellets may be composed of gelatin, casein, etc., but, generally, are preferably composed of a digestible fat which has nutritive value. Fat pellets advantageously have a small amount of iodine incorporated therewith as a supplement to aid in assimilation of the fat. Where iodine is used, each pellet or the like may contain a small amount, or sufficient iodine to render a large number of fat pellets readily assimilated may be contained in a small portion of the total number of pellets used.

The pellets shown in Fig. 1 may all be found admixed with a single feed, and that feed may also contain sand-sized particles, or it may contain sand-sized particles and no pellets. The pellets are easier to count and will ordinarily be used for analysis. The sand-sized particles will ordinarily be of the same shape but may differ from one another somewhat in size. If desired, sand-sized particles and pellets of a size easily counted may be added to a feed in a desirable ratio so that analysis may then be readily made by counting only the pellets.

To illustrate, it will be assumed that all of the pellets of Fig. 1 are composed of a hydrogenated fat. Each may contain a single supplementary material, such as a vitamin, mineral, etc. All may contain iodine and just one other supplementary material in addition. If a large amount of one supplementary material, such as calcium phosphate, is required, each of the different pellets may contain this and also a vitamin or other mineral in addition. For instance, each of the pellets shown in Fig. 1 may contain the same percentage weight of a phosphate; and, in addition, the green rod-like pellet may contain vitamin D, the yellow triangular pellet vitamin A, the blue block-like pellet vitamin G, etc.

Alternatively, if calcium phosphate is to be added to only some of the pellets, and a different mineral—e. g., manganese sulfate—is to be added to other pellets, and iodine is to be added to other pellets, all of the rod-like pellets, such as the green pellet of Fig. 1, may be known to contain no mineral but only a vitamin which will be indicated by the color of the pellet. Then, the triangular pellets may be known to contain phosphate, the block-like pellets may be known to contain manganese sulfate, and the flat pellets may be known to contain iodine, and colors may be used with each to identify the vitamins they contain. In that case, if the feed contains differently colored pellets, and they are all triangular, it is known that they all contain phosphate, and the vitamins present will be identified by color. If a feed contains some pellets of each of the four shapes shown in Fig. 1, and the pellets of each of these shapes are differently colored, still the analysis may be quickly made.

As explained, color and/or shape may be used to indicate composition, percentage, etc. Great flexibility is permitted.

In a preferred form of the invention a color comparator is employed for determining the strength of decomposable vitamins or other supplements. For example, assuming that the pellets of Figs. 2a and 2b have provitamin A (carotene) dispersed in them, instead of supplying a separate color comparator or in addition to such a color comparator, the pellets themselves may contain one or more bands of nonfading yellow material to serve as a comparator. Alternatively, they may contain a band of colored material very susceptible to decomposition with the balance colored with a nonfading color. If properly incorporated in a fat, little decomposition of the provitamin A will occur except on prolonged storage or other aging. However, if the provitamin is incorporated in a different type of material, decomposition may occur much more rapidly.

For the purpose of illustration it may be assumed that Figs. 2a and 2b illustrate pellets in which decomposition has occurred. When placed on the market and before decomposition has set in, each pellet is of uniform color; i. e., the portion containing the dispersed provitamin is the same color as the unfading band or bands shown. These permanently colored bands are advantageously made of the same composition as the rest of the pellets except that they contain the permanently colored material which is the same color as the undecomposed provitamin. The single band of 2a is readily incorporated in the pellet by extruding three different plies of material and plying them up as they are extruded and cutting them to length, or by plying up three large sheets of the material and then cutting the composite sheet. The pellet of Fig. 2b is similarly constructed although two bands of the colored material are employed to make the degree of decomposition more readily ascertainable.

The two colored bands of the pellets shown in Fig. 2b may, if desired, be of different intensity. Then, if decomposition has taken place and the one band shows the original strength and the other bands shows the minimum permissible strength, it may be determined whether the pellet still contains sufficient provitamin for any effective use, and if so, its approximate potency.

If, instead of making the bands of a permanent color, they are made of a nonpermanent color so that they fade (or otherwise change color) on aging, it may, likewise, be readily determined at a glance if appreciable loss in potency has occurred. If the purpose is to determine qualitatively rather than quantitatively whether decomposition has taken place, any color which fades or otherwise changes color sufficiently rapidly when exposed to light or air or heat, etc., may be used, depending upon whether the potency of the vitamin is reduced by light or air or heat, etc. Bands containing materials which change colors at different rates or under different conditions may be used to aid in determining the degree of decomposition which has taken place. The color indicator may change color under exactly the conditions which cause decomposition of the vitamin and at exactly the same rate, but this is not necessary.

There are various ways in which a single color band or a plurality of color bands may be employed to show whether decomposition has occurred, and, if so, the extent of the deterioration which has occurred. If the food supplement has undergone any considerable decomposition, a larger number of pellets may be used in compounding any formula than when the pellets contain provitamin of the standard strength, or if the formula has been compounded before the loss has been determined, additional vitamin may be added to the compounded material. If, for example, a formula for a chick feed, etc., has been prepared, and the supplement has deteriorated, it may be brought up to standard strength levels by the addition of more pellets containing that supplement. Such pellets may be of standard strength or of much greater concentration.

Fig. 3 shows capsules of a variety of shapes and colors which may be used according to a code to indicate the composition, origin, etc., of one or more food supplements they contain. For instance, A and B show clear-shelled capsules of different shape, each of which contains a yellow-colored composition. The color of the composition may, for example, indicate that capsules A and B both contain provitamin A, and the shapes may indicate that A contains no phosphate and capsule B contains phosphate in an amount indicated by a predetermined code. Or the shapes of A and B may indicate according to the code that each was produced by a different manufacturer. The different shapes may convey any desired information. Coatings, etc., may be applied to the capsules to perform the same function.

Capsules C and D both comprise but a single compartment. The two halves of each are of different colors, yellow and green. Both contain a red or pink composition. The shape of each capsule and the colors of its two halves may each convey information according to a code, and the color of the composition may be merely inherent in any composition compounded of the ingredients it contains.

Capsules E, F, and G are each composed of two compartments.

Capsules H and I are single-compartment capsules with walls of a single color, differently shaped, and containing colored and colorless liquid, respectively. Each of the colors and the different shapes may convey desired information according to the code.

Capsules J and K have clear, colorless shells; one contains a colored barrier strip, and they are of different shapes. The shapes convey information according to the code adopted, and the color of the barrier strip may, likewise, convey any desired information.

Capsules L and M illustrate the use of colorless barrier strips in colored capsules of different shape which contain differently colored compositions in their lower halves. The upper halves will ordinarily contain different compositions from that contained in the lower halves and may or may not be colored. The colors of the compositions may be inherent. The shapes and colors of the capsules, including the color of the barrier strip, may be used to convey any desired information according to a code.

The fact that a capsule and its contents are both the same color may be used to convey information, regardless of the color. This is illustrated in capsule N.

The colors, shapes, etc., shown in Fig. 3 are merely illustrative of the many uses of color and shape, etc., to convey information concerning capsuled food supplements according to code.

Color may be used in any suitable manner with a capsule to indicate whether the capsule has been stored a sufficient length of time to age appreciably and also, if desired, the extent of decomposition which has taken place. If the composition is colored naturally or artificially with a fading color, the fact that decomposition has occurred may be easily detected if a part of the capsule is the color of the fresh, unfaded composition. By coloring one part of the capsule the color of the fresh, unfaded composition and another part of the capsule the color of the composition after decomposition of known extent has taken place, it is easily possible by comparing these two colors with the color of the composition to determine whether appreciable aging has taken place and, if so, to approximate the loss in potency which the composition may have suffered. Alternatively, adjacent portions of the capsule—e. g., the two halves—may be matched for color, as in capsule N (above); the color of one half may be permanent, and the color of the other half may be unstable. It is then possible to determine at a glance whether the capsule is fresh.

Figs. 4a and 4b show two different types of capsules, half of each of which is colored yellow so that the capsules will serve as color comparators when they contain provitamin A (carotene). The capsule of Fig. 4a is of the well-known type formed from two sheets of gelatin and filled with a liquid. One of the gelatin sheets may be colored the color of the fresh undecomposed provitamin. If the provitamin decomposes appreciably, its color will fade, and this may easily be discerned by comparing the two halves of the filled capsule to determine whether there is any noticeable difference in color between them.

The telescoping type of capsule designed for nonliquids, shown in Fig. 4b, may be filled with a powder or a greasy material or the like for human or animal consumption. One half of the capsule (preferably the outer half) is uncolored, and the inner half is colored. For instance, if the capsule contains provitamin A (carotene), the walls of the inner half may be colored the same as the original vitamin composition. It can then readily be determined whether the composition has aged sufficiently to change color.

Instead of coloring the whole of one half as indicated in Figs. 4a and 4b, either capsule may be banded with one or more bands which may be of the same or different colors which may be fading or permanent. For instance, there may be one permanent band and one fading band.

Instead of constructing a pellet or capsule or the like so that it itself serves as a comparator, a separate color comparator may be used. This comparator may be printed on a card or sheet of paper for permanent reference or for insertion in a package, or it may be printed on the exterior of a package or on a label to be pasted onto a package, etc. The comparator may be of a single color for determining whether a single food supplement has decomposed, and the extent of the decomposition; or it may comprise several colors for testing as many different food supplements.

For example, a common food supplement which is quite unstable is provitamin A (carotene). It is inherently yellow, and the color fades as it decomposes. A color comparator of the same yellow of different intensities may be used for determining the strength of a solution or capsule or pellet, etc., which contains this provitamin. For a system which includes pellets, capsules, etc., of a standard strength, the color comparator may be composed to show whether the pellets, etc., in question have suffered loss in potency and, if so, the calibration may show the extent of the decomposition which has taken place. If the comparator is to be used to test the strengths of different compositions regardless of a standard, different calibration will be required. The color comparator may be composed of separate patches of yellow of different intensity or a single strip which gradually fades from a yellow of the provitamin at standard strength to a yellow of any desired less intensity.

For the purposes of this invention it is not essential that the color comparator be used with a food supplement, and it is not essential that the comparator be printed on a sheet of paper or the like. For example, the comparator may be used for analyzing the chemical content of a fertilizer, and it may constitute pellets or the like, some of which are permanently colored and some of which fade on aging, so that by comparing the pellets with one another, it may readily be determined whether deterioration has occurred and also, if desired, the amount thereof. The deterioration may be indicated by a complete change of color or by color fading. For example, a fertilizer the pH of which changes to a marked degree on deterioration may contain pellets of the fertilizer impregnated or coated with an indicator dye which changes color on such change in pH value.

To further illustrate, if a feed contains a number of vitamins or other decomposable supplements embodied in different pellets, those which are not inherently colored with a color which fades or changes as decomposition occurs may be artificially colored with a dye which fades or changes on aging, and a separate comparator may be used for each. Alternatively, if the supplements are all of standard strength when the feed is prepared, a single comparator may be used for determining the change in color in the pellets of one unstable color, and the potency of all may be determined from the known relative stability of the various supplements.

The comparator may be calibrated to give directly any desired information. It may, for example, be calibrated in per cent loss in potency, present per cent potency, units (e. g., International Units, A. O. A. C. Units, etc.) per single pellet, units per pound of pellets, units per stated volume or weight of feed containing the pellets, etc., thereby giving directly a very accurate, proximate, visual analysis of the pellets or feed.

To illustrate, a manufacturer or association of manufacturers may adopt the following code: Cylindrical pellets may be used for all vitamin-containing pellets, and pellets of other shapes may be used for other supplements. The following colors may be used to indicate the vitamins contained in the different cylindrical pellets. Different shades of the various colors may be used to indicate which of the various vitamins or vitamin complexes in any group is intended, or any other visual means of identification may be used for this purpose, as required. A suggested code is:

Yellow.—The group of vitamins A
    Vitamin A
    Vitamin $A_2$
    Vitamin $A_3$
Red.—Vitamin $B_1$
    Riboflavin (vitamin G)
    Vitamin $B_6$
    Nicotinic acid
    Pantothenic acid
    Inositol
    P-amino-benzoic acid
Green.—Vitamin C
Blue.—The group of vitamins D
    Vitamin $D_2$
    Vitamin $D_3$
    Vitamin $D_4$
    Vitamin $D_5$
    Vitamin $D_6$
Orange.—The group of vitamins E
    Alpha-tocopherol
    Beta-tocopherol
    Gamma-tocopherol
Violet.—Vitamin H
Indigo.—The group of vitamins K
    Vitamin $K_1$
    Vitamin $K_2$
Black.—Vitamin P The table is not intended to be complete but is merely suggestive of a code which may be adopted.

Dyes or pigments of appropriate colors will be compounded with the hydrogenated fat or other carrier base used for the pellets to designate the respective vitamins. If the vitamin is unstable, it may be compounded with a fading dye or other coloring material so that on aging, by comparison with the colors of a suitable color comparator, the extent of decomposition suffered may be visually determined even though the vitamin itself does not change color on aging. A relatively unstable coal-tar dye, such as 1-phenylazo-2-naphthylamine, etc., or a relatively unstable vegetable dye, such as tartrazine, carmine, ponceau, amaranth, chlorophyl, etc., may be used.

Desirable minerals, such as calcium phosphate, etc., may be incorporated in the same pellets as the vitamins, or the minerals may be separately incorporated in pellets containing no vitamin. At times it may be desirable to add a filler to the hydrogenated fat to give it bulk without excess fat content, bulk being necessary to give relatively uniform distribution throughout the feed without making the pellets so small that they are difficult to segregate and count.

The following example illustrates one embodiment of the invention.

In addition to the vitamins the following ingredients were employed:

|  | Per cent |
|---|---|
| Calcium carbonate | 35.2 |
| Calcium phosphate | 15.0 |
| Manganese sulfate | 1.23 |
| Potassium iodide | 0.0125 |
| Hydrogenated fat | 48.57 |

The minerals in finely ground form were added to the fat in molten condition. To a batch of this composition provitamin A (carotene) was added in an amount sufficient to incorporate the 36,000 International Units of the provitamin in each one-third pound of the complete formula. Inasmuch as provitamin A is contained in an oil as a carrier, and the units of the provitamin per volume of oil vary from time to time, the amount of such oil is deducted from the amount of hydrogenated fat required by the above formula to determine the amount of hydrogenated fat actually used.

To a second one-third pound of the above mixture of minerals and fat there were added 36,000 A. O. A. C. units of vitamin D in an oil carrier. The amount of hydrogenated fat actually employed was corrected as above for the amount of oil present as vitamin D carrier.

To a third one-third pound of the above mixture 53,800 micrograms of vitamin G were added. The vitamin G was purchased in combination with calcium carbonate as a carrier. To compensate for the addition of such calcium carbonate, the amount of calcium carbonate present as carrier was deducted from the amount of calcium carbonate required by the above formula.

The mass containing the carotene was a brilliant yellow, and the other two masses were colorless. By adding coloring matter to one of these, the three could readily be distinguished at a glance. However, to be consistent with the above proposed code, the mixture containing the vitamin D was colored blue, and that containing the vitamin G was colored red. A water-soluble dye (about 0.10 gram per one-third pound) was added in water solution to a water paste or slurry of the calcium carbonate, and the resulting dyed carbonate was dried, ground, and added as a colored powder to the molten hydrogenated fat to color it.

The three compositions containing the hydrogenated fat, mineral matter, and the three different vitamins were separately extruded into cylindrical pellets $\frac{3}{32}$ inch in diameter and $\frac{3}{32}$ inch long, each weighing about .018 gram, or 25,000 pellets per pound.

Assume that a miller or feed manufacturer orders these three different pellets in quantity for the preparation of a chick feed composed essentially of mixed grains which he knows from a reliable source to be deficient in vitamin content and to contain only 126,200 micrograms of riboflavin per 100 pounds. He desires to fortify this to bring it to a recommended riboflavin content of 180,000 micrograms per 100 pounds. Therefore, he must add 53,800 micrograms of riboflavin to each 100 pounds of the mixed grain to fortify it to recommended nutritional levels. This requires for each 100 pounds of the feed one-third pound or 8,300 of the riboflavin-containing pellets compounded according to the stated formula.

Assume that, similarly, it is indicated that an additional 36,000 International Units of provitamin A and 36,000 A. O. A. C. chick units of vitamin D are required to bring the feed mixture up to recommended nutritional levels for these vitamins. He, therefore, must add 8,300 each of the pellets (one-third of a pound) containing vitamins A and D, respectively. In so doing, he has in addition to furnishing a supplemental quantity of vitamins, provided a recommended quantity of digestible fat containing essential minerals in desired amount to form a well-balanced feed.

The manufacturer of such supplements would supply to the miller or feed manufacturer or user preferably in pellet form the supplement as described herein which would contain the required vitamins, minerals, and fat packed in suitable containers so that by adding 1 pound of the supplement mixture to 100 pounds of feed, proper fortification to desired nutritional levels would be accomplished.

Such a package would have in combination therewith a key for identification and analysis of the contents of the package and/or a color comparator for visual analysis. Fig. 5 shows a chart which includes both such a key and a color comparator. The chart may be equipped to be hung on the wall. It may be attached to or contained in a container or be an integral part of said container or otherwise used in conjunction with the product.

The key gives the mineral and fat content in terms of percentage and, in addition, gives the various vitamin contents, a means of identifying which is accomplished by the cylindrical shape of the pellets and their respective coloring: provitamin A being indicated by yellow, vitamin B by blue, and vitamin G by red. The initial potency of each of these vitamins when packed is also indicated on the chart in recognized terms of measurement.

The chart is also provided with three color comparators, one for each vitamin. Each comparator is so colored with permanent colors that the full color at the top of the comparator matches the color of the pellets before any deterioration has taken place. By selecting a pellet —for example, a yellow pellet—and comparing its color with the full color at the top of the comparator, it will be apparent if any appreciable deterioration has taken place because there will then be a marked difference between the shade of the pellet and the shade of the comparator.

The color comparator is so colored that the color is graduated from the full color at the top to any desired lesser shade. Such graduation is in a direct ratio to the fading rate of the coloring material in the pellet which in turn fades in a direct ratio to the loss in potency or deterioration of the vitamin content of the pellet. Therefore, the comparator is calibrated in recognized terms of measurement of the particular vitamin being tested and may indicate the remaining potency of the vitamin pellet in actual units per pound of the concentrate, etc.

In determining the potency of any pellet, one or more pellets are melted to uniformly distribute the coloring matter therein, allowed to harden, and the color of the resultant bead is matched on the comparator and the potency read at the point of matching.

The determination of the loss in potency of the pellets containing vitamins D and G may be carried out in like manner. In some cases a measurement of the least stable of the vitamin constituents of a mixture may be used to provide an index as to the deterioration of the entire mixture. If appreciable deterioration has taken place, the miller or feed manufacturer will ordinarily return the entire supplement mixture to the source of supply. If he desires, he may compensate in some manner for such loss. A farmer or other party who may have stored the supplement and may thus be responsible for the decrease in potency will find some means for such compensation as by adding vitamin-containing pellets in the required amount.

The chick feed is produced by mixing 1 pound of the supplement with 100 pounds of grain, etc., as described in the chart of Fig. 5. This chart is labeled "Chick Feed Supplement A." Supplements of other composition may be similarly prepared as required.

The poultry man who is the party ultimately interested in the supplement content of the feed purchased and fed to the chicks can by the use of the comparator determine whether the vitamin-containing pellets actually have the advertised vitamin content when the feed is purchased. Furthermore, if it is necessary for him to store the feed before use, he can readily detect deterioration and the amount thereof and effectively compensate for any deficiencies by adding vitamin in pellet form or by other means of fortification. It will be to his advantage to add any such additional vitamin in pellet form because its potency can readily be determined by him.

The use of such pellets thus prevents misrepresentation to the farmer and, likewise, provides him with a means of ready analysis, both of a qualitative and a quantitative nature. The value of this is at once apparent when it is realized that vitamin G, for example, has not hitherto been analyzable except by biological determination. Therefore, a new method for making close proximate analyses of compounds containing vitamin G and other deteriorable materials is provided. The method is applicable to hormone compositions, etc.

A further chart illustrating the invention is shown in Fig. 6, the chemical composition of the supplement being identical with that illustrated in Fig. 5. In this example the various vitamins and minerals are incorporated in different pellets, the pellets containing the vitamins being colored and shaped the same as illustrated in Fig. 5, and the pellets containing the different minerals being uncolored and distinguished by shape, each shape identifying the mineral in the pellet. It is obvious that the number, size, and form of the pellets may be varied for convenience in mixing, distribution, analysis or application. The carrier may also be varied by using all the fat in the vitamin-containing pellets and using a binder, such as molasses, etc., for the various mineral constituents to provide an additional nutritive substance and enhance palatability. One or more ingredients may be combined in the same pellet where desirable.

In compounding the pellets, regardless of the nature of the carrier employed, antioxidants, such as hydroquinone, or other preservatives may be incorporated therewith. Fillers or extenders, etc., may be used to aid in distribution.

There are special supplements for specific purposes which when fed with fats are particularly productive of results. This invention contemplates the incorporation of such supplements in pellets having a digestible fat as a carrier therefor. For example, pellets of a digestible fat which incorporate thyroprotein, with or without a mineral in the proper proportions, when mixed with a dairy feed have been found to be especially effective in increasing the milk and butter-fat yield of dairy cattle.

The comparators and charts of the type described may be used in various combinations in different types of packages. For instance, Fig. 7 shows the bottle 10 filled with liquid, pills, powder or the like and is provided with the comparator 11. One end of the comparator is a dark yellow of the color of the solid or liquid contents of the bottle when it contains provitamin A of a standard potency. As the material ages, the provitamin decreases in potency, and by comparing the color of the contents of the bottle with the comparator, the potency of its contents at any time may be determined directly in terms of percentage or unit strength, etc. If the bottle contains a physician's prescription and appreciable deterioration is apparent, a new supply should be secured.

Fig. 8 illustrates a package of the bag type designed for holding food containing supplements. The food may be feed for animals and birds, etc., or cereal grains or a confection for human consumption. For example, the package may contain a dry cereal, such as corn flakes or the like, in which a portion of the flakes has been fortified by coating or impregnating with vitamins, minerals, fats, etc., differently colored to carry out the principles set forth herein. Alternatively, the corn flakes may contain flakes or pellets or the like formed of fat or other carrier material suitably colored and containing vitamins, minerals, etc.

The construction of the walls of the bag of Fig. 8 is illustrated in section in Fig. 10. These walls are formed of a plurality of plies of sheet material 16 (Fig. 10) in substantially face-to-face relation, one wall having a transparent section 17 forming a window. This window may be composed of layers of transparent nonhydroscopic material, such as cellophane or glassine paper or the like, the marginal portions of which overlap and are sealed to the adjacent inner and outer layers 16 of the wall of the bag. To protect the contents of the bag from light, this window may be provided with a hinged cover 18 which may be taped closed until purchased. Color comparators 20 may be fastened to the window. Three comparators as shown may be used on a package containing three decomposable supplements which are subject to deterioration under different circumstances. For instance, one may be affected by heat and the other not. When the package is sold, the purchaser will remove the tape and lift the lid and, by comparing the color of the contents, can determine at a glance whether the package is fresh or has aged in storage, and if so, which of the contents have been affected and possibly also the amount of deterioration. The supplement content of the package may be again checked at the time of use.

To aid the purchaser in analyzing the contents of the package, a chart 21, such as the chart of Fig. 5 or Fig. 6, may be attached to the outside of the package as a label. The inner and outer plies of the walls may be formed of paper having high mechanical strength. If the package is to be used for feed or the like, one of the inner plies may be paper impregnated with a substance capable of preventing the ravages of insects and rodents, and another inner ply may be formed of paper impregnated with a suitable insecticide, such as dichloro diphenyl trichloro ethane. The insecticide-impregnated paper preferably lies outside of the ply which contains the rodent repellent, which may, for example, be sulfonethyl methane.

Although the above description of the package refers more particularly to a package containing food, the invention is not limited thereto but includes a package containing any decomposable substance and the use of a color comparator in combination therewith. The packages are so adapted that inert gas may be contained therein to aid in preserving the contents.

Fig. 9 illustrates another form of container consisting of a carton 25 having a window 26 with a hinged flap 27 and color comparators 28 and chart 29 similar to those illustrated in Fig. 8 and more particularly designed for packaging pellets. The chart of this illustration may be that shown in either Fig. 5 or Fig. 6. As illustrated in Fig. 11 the carton may consist of inner and outer walls 30 and 31 of high mechanical strength and an inner corrugated layer 32 which is preferably composed of nonhydroscopic material. The spaces between the reinforcing layer 32 and the inner and outer walls may contain a substance 33 capable of preventing the ravages of insects and rodents, and on the other side a suitable insecticide 34; or the insecticide and rodent repellent material may be intermixed.

Fig. 12 shows a modified form of multi-walled bag which may be filled and sealed as shown in Fig. 8. The outer layers 40 and 41 of this bag are formed of paper of high mechanical strength. The center ply 42 is transparent. The plies 43 and 44, respectively, may be impregnated with an insecticide and rodent repellent material. Instead of impregnating the plies, the laminating material 45 between the plies may contain insecticide and rodent repellent. They may be mixed with the adhesive as a dust, for example. The opaque plies have registering openings, and the outer ply may form a flap 46 to cover the window. The color comparators 47 are shown on the interior of the package although, if preferred, they may be on the outside of the window or between plies of the transparent material; or the material of which the window is formed may be impregnated with the coloring material of the comparator so that the colors are distributed uniformly throughout the thickness of the window.

Fig. 13 shows a further modification of the bag construction which comprises two transparent plies 50 and 51 which are brought together at the window. The outer plies 52 and 53 and the center ply 54 may be of paper of high strength impregnated with insecticide or rodent repellent material as desired. The outside ply 53 includes the flap 55.

The invention relates more particularly to food supplements, whatever their use, and whether or not combined with a food, but is not limited thereto. The natural color of the colored food supplements may be used in carrying out the invention described, or coloring matter may be added. Color alone may be used as the distinguishing characteristic of the various bodies here described, or they may be distinguished solely on the basis of characteristic shapes imparted to them by any suitable means. Any means for visually distinguishing them may be utilized. The examples and illustrations are not to be construed in a limiting sense as the invention is defined in the appended claims.

What I claim is:

1. Solid sand-sized particles of a hard, waxy hydrogenated oil which contain food supplement.

2. Solid sand-sized particles of a hard, waxy hydrogenated oil which contain vitamin.

3. Solid sand-sized particles of a hard, waxy hydrogenated oil which contain mineral food supplement.

4. Solid sand-sized particles of hard, waxy hydrogenated soya bean oil which contain food supplement.

5. Animal feed having mixed therewith solid sand-sized particles of a hard waxy hydrogenated oil which contain feed supplement.

6. Animal feed having mixed therewith solid sand-sized particles of a hard waxy hydrogenated oil which contain feed supplement, some of the particles being of one color and other particles being of another color, the particles of one color containing different feed supplement from particles of the other color.

7. Solid sand-sized particles of a hard, waxy hydrogenated oil which contain provitamin A.

8. Solid sand-sized particles of a hard, waxy hydrogenated oil which contain vitamin A.

9. Solid sand-sized particles of a hard, waxy hydrogenated oil which contain a vitamin D.

10. Solid sand-sized particles of a hard, waxy hydrogenated oil which contain a vitamin E.

References Cited in the file of this patent

UNITED STATES PATENTS

| Number | Name | Date |
|---|---|---|
| 634,855 | Pattison | Oct. 10, 1899 |
| 1,134,156 | Planten | Apr. 6, 1915 |
| 1,148,621 | Planten | Aug. 3, 1915 |
| 1,419,618 | Deming | June 13, 1922 |
| 1,633,711 | Prince | June 28, 1927 |
| 1,734,621 | Goldberg | Nov. 5, 1929 |
| 1,747,486 | Ridgway | Feb. 18, 1930 |
| 1,764,085 | Placak | June 17, 1930 |
| 1,886,931 | Alexander | Nov. 8, 1932 |
| 1,917,048 | Midgley, Jr. | July 4, 1933 |
| 1,964,867 | Allyn | July 3, 1934 |
| 2,031,724 | McKinney et al. | Feb. 26, 1936 |
| 2,063,245 | Haeseler | Dec. 8, 1936 |
| 2,150,649 | Ellis | Mar. 14, 1939 |
| 2,157,755 | Harrel et al. | May 9, 1939 |
| 2,159,997 | Millar | May 30, 1939 |
| 2,287,495 | Moyers | June 23, 1942 |
| 2,318,434 | Strauch | May 4, 1943 |
| 2,370,419 | Ray | Feb. 27, 1945 |
| 2,382,242 | Lindow et al. | Aug. 14, 1945 |

FOREIGN PATENTS

| Number | Country | Date |
|---|---|---|
| 111,726 | Australia | Oct. 11, 1940 |